(12) United States Patent
Connolly et al.

(10) Patent No.: US 6,456,460 B1
(45) Date of Patent: Sep. 24, 2002

(54) TRACK WIDTH DEFINITION BY PATTERNING OF SHARED POLE FOR INTEGRATED THIN FILM/ MAGNETORESISTIVE HEAD

(75) Inventors: Maura P. Connolly, Limavady (IE); Alan B. Johnston, Derry (IE); Mark E. Troutman, Rochester, MN (US); David Hutson, Eglinton (IE)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/437,954

(22) Filed: Nov. 10, 1999

Related U.S. Application Data
(60) Provisional application No. 60/078,902, filed on Mar. 20, 1998.

(51) Int. Cl.[7] ............................................... G11B 5/147
(52) U.S. Cl. ....................................................... 360/126
(58) Field of Search ................................. 360/121, 126, 360/119, 317

(56) References Cited

U.S. PATENT DOCUMENTS

| | | | | |
|---|---|---|---|---|
| 4,951,166 A | * | 8/1990 | Schewe | 360/119 |
| 5,121,270 A | | 6/1992 | Alcudia et al. | 360/77.01 |
| 5,276,579 A | | 1/1994 | Takamori | 360/126 |
| 5,505,635 A | | 4/1996 | Das | 29/603 |
| 5,703,740 A | * | 12/1997 | Cohen et al. | 360/126 |

* cited by examiner

Primary Examiner—Robert S. Tupper
(74) Attorney, Agent, or Firm—Kinney & Lange, P.A.

(57) ABSTRACT

A read while write dual bump tape head for increasing allowable linear and areal bit density comprises first and second thin-film inductive write heads. The first thin film, inductive write head has a first top pole and a first shared pole. The first shared pole is patterned such that it has a width at a tape bearing surface of the dual bump tape head narrower than a width of the first top pole at the tape bearing surface. The second thin-film inductive head has a second top pole and a second shared pole. The second shared pole is patterned such that it has a width at the tape bearing surface narrower than a width of the second top pole at the tape bearing surface.

12 Claims, 2 Drawing Sheets

TRACK WIDTH DEFINITION BY PATTERNING OF SHARED POLE FOR INTEGRATED THIN FILM/ MAGNETORESISTIVE HEAD

CROSS-REFERENCE TO RELATED APPLICATIONS

This application claims priority from Provisional Application No. 60/078,902, filed Mar. 20, 1998 for "Track Width Definition by Patterning of Shared Pole for Integrated Thin Film/Magnetoresistive Head" by Maura P. Connolly, Northern Ireland, United Kingdom; Alan B. Johnston, Northern Ireland, United Kingdom; Mark E. Troutman, Northern Ireland, United Kingdom; David Hutson, Northern Ireland, United Kingdom.

BACKGROUND OF THE INVENTION

The present invention relates generally to the field of electronic data storage. In particular, the present invention relates to track width definition by patterning of shared poles for an integrated thin film/magnetoresistive head.

Thin film magnetic transducing heads are used for magnetically reading information from and writing information to a magnetic storage medium such as a magnetic disc or a magnetic tape. Transducing heads each include a reader portion and a writer portion. The reader portion, which includes a top shield, a bottom shield, and a magnetoresistive (MR) reader positioned between the top and the bottom shields, is used to read magnetically encoded information from the magnetic medium by detecting magnetic flux stored on the magnetic medium. The MR reader (which includes amorphous MR readers, giant MR readers, and spin tunneling readers) generally consists of various magnetic and nonmagnetic layers. The writer portion, which includes a top pole, a bottom pole, conductive coils positioned between the top and bottom poles, and a write gap between the top and bottom poles writes magnetic information to the storage medium. Typically, the top shield of the reader portion and the bottom pole of the writer portion are combined into a common shared pole.

During a write operation, the media moves past an air bearing surface of the writer portion of a transducing head, such that a particular portion of the media will first encounter a leading pole of the writer followed by a trailing pole. Magnetic transitions are produced by transducing head only when the applied field falls to media coercivity, i.e., all data is written by the trailing pole. Accordingly, the trailing pole defines the track width of the written data. In disc drive applications, the trailing pole is always the top pole, which is patterned to allow for a more narrow track width. In tape drive applications, in which the magnetic tape media moves bi-directionally, the trailing pole may be either the top pole or the shared pole.

Data are stored on magnetic tapes in parallel tracks that extend in the direction of the length of the magnetic tape. Historically, write-wide, read-narrow methodologies were sufficient to ensure that the read heads remained on-track during read-back. With increased data densities on magnetic tapes, new head assemblies were developed that moved across the width of the magnetic tape, such that each read and write head in the head assembly would have access to multiple data tracks. However, write-wide, read-narrow methodologies are no longer sufficient to ensure that these new assemblies remain on track. As a result, dual bump tape heads have been developed to limit tracking errors in these new assemblies.

Bi-directional, dual bump tape heads have two transducing heads and are capable of operating in a read while write (RWW) mode. In this RWW mode, a leading transducing head writes information to the tape, while a trailing transducing head reads information from the tape, either data or servo information to ensure that the dual bump tape head remains on track. Each transducing head, or "bump", includes a writer portion having a top pole, a shared pole, conductive coils positioned between the top pole and the shared pole, and a flex circuit connected to the conductive coils.

The bumps within a dual bump tape head may be configured in a first configuration with the shared poles of both bumps being centrally located and the top poles of both bumps being peripherally located, such that the shared poles are sandwiched between the top poles (e.g., the reader portions of the two bumps are positioned back-to-back). Conversely, the bumps may be configured in a second configuration with the top poles centrally located and the shared poles peripherally located, such that the top poles are sandwiched between the shared poles (e.g., the writer portions of the two bumps are positioned back-to-back).

In the first configuration, the shared pole of the leading bump always writes; whereas in the second configuration, the top pole of the leading bump always writes. Accordingly, the second configuration results in a narrower track width than in the first configuration since the patterned top pole is narrower than the shared pole. However, in the second configuration, the flex circuits for the two bumps, which connect to the conductive coils of each bump, are located closer to one another than in the first configuration, resulting in a greater amount of cross-talk between bumps in the second configuration than in the first configuration.

There is therefore a need for a dual bump tape head which allows for a more narrow track width while minimizes cross-talk between bumps.

BRIEF SUMMARY OF THE INVENTION

A read while write dual bump tape head for increasing allowable linear and areal bit density comprises first and second thin-film inductive write heads. The first thin film, inductive write head has a first top pole and a first shared pole. The first shared pole is patterned such that it has a width at a tape bearing surface of the dual bump tape head narrower than a width of the first top pole at the tape bearing surface. The second thin-film inductive head has a second top pole and a second shared pole. The second shared pole is patterned such that it has a width at the tape bearing surface narrower than a width of the second top pole at the tape bearing surface.

DETAILED DESCRIPTION

Figure 1:
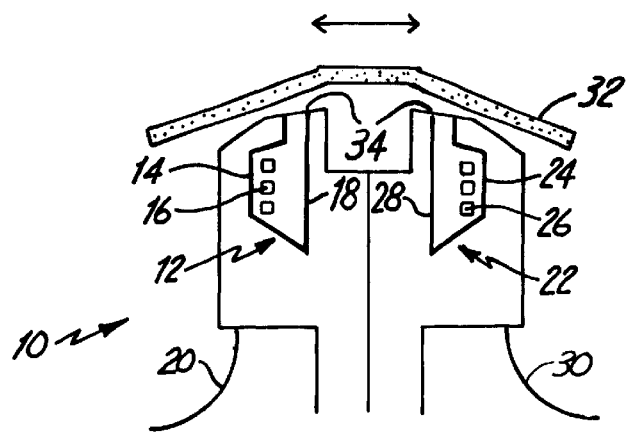
FIG. 1 is a cross-sectional view of a dual bump tape head having first and second transducing heads.

FIG. 1 is a cross-sectional view of dual bump tape head 10 having first and second transducing heads 12 and 22. First transducing head 12 has top pole 14, conductive coils 16, shared pole 18, and flex circuit 20. Flex circuit 20 electrically connects to conductive coils 16, which are positioned between top pole 14 and shared pole 18. Second transducing head 22 has top pole 24, conductive coils 26, shared pole 28, and flex circuit 30. Shared poles 18 and 28 are each positioned toward a center of dual bump tape head 10, while top poles 14 and 24 are each positioned distally from the center of dual bump tape head 10. Flex circuit 30 electrically connects to conductive coils 26, which are positioned between top pole 24 and shared pole 28. Magnetic tape 32 scrolls past tape bearing surface 34 of dual bump tape head 10 in forward and reverse directions as indicated by an arrow in FIG. 1. Each of first and second transducing heads 12 and 22 also include a reader portion not shown in FIG. 1.

Dual bump tape head 10 is used in a read while write (RWW) in which a leading transducing head writes information to tape 32, while a trailing transducing head reads information from tape 32, either data or servo information to ensure that dual bump tape head 10 remains on track. Accordingly, during a write operation in which first transducing head 12 is the leading transducing head (i.e., magnetic tape 32 is moving from the left to the right in FIG. 1), magnetic tape 32 will first encounter top pole 14, followed by shared pole 18. Similarly, when second transducing head 22 is the leading transducing head (i.e., magnetic tape 32 is moving from the right to the left in FIG. 1), magnetic tape 32 will first encounter either top pole 24, followed by shared pole 28.

Magnetic transitions are produced by writers of first and second transducing heads 12 and 22 only when the applied field falls to media coercivity, i.e., all data is written by the trailing pole of the leading transducing head. Accordingly, the trailing pole defines the track width of the written data. In dual bump tape head 10, the trailing pole is always either shared pole 18 of first transducing head 12 or shared pole 28 of second transducing head 22.

Figure 2B:
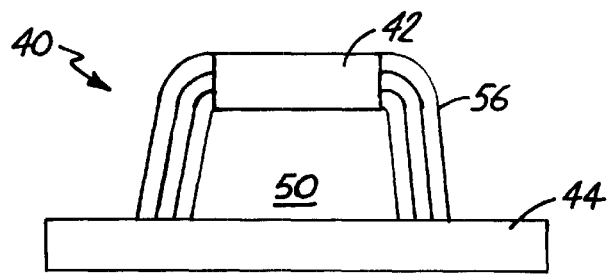
FIG. 2B is a view of an air bearing surface of the write head of FIG. 2A.
Figure 2A:
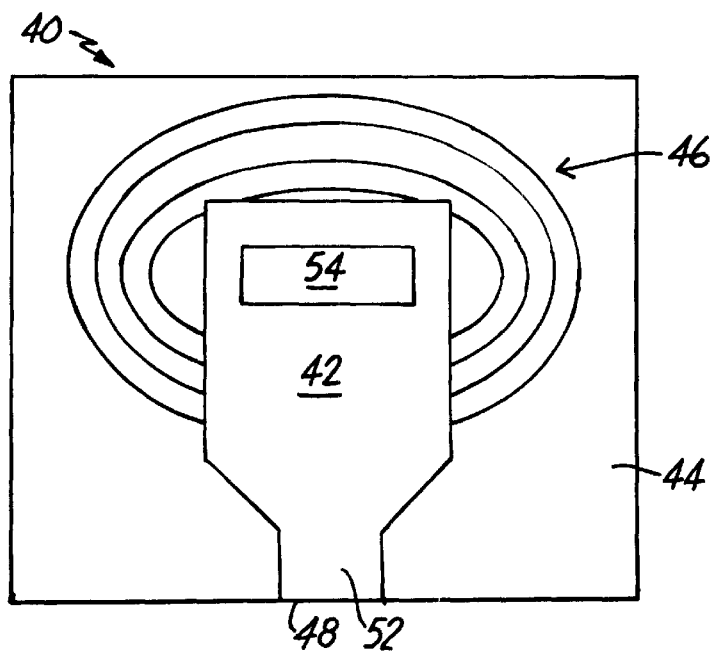
FIG. 2A is a top view of a prior art, thin film, inductive write head.

FIG. 2A is a top view of prior art, thin film, inductive write head 40 which includes top pole 42, shared pole 44, conductive coils 46, and tape bearing surface 48. FIG. 2B is a view of tape bearing surface 48 of inductive write head 40 showing write gap 50. Top pole 42 is located above shared pole 44 and is narrower in width than shared pole 44. Conductive coils 46 are positioned between top pole 42 and shared pole 44.

Top pole 42 is patterned to channel flux toward tape bearing surface 48. Top pole 42 includes neck 52 adjacent tape bearing surface 48 and back via 54, which extends from top pole 42 toward shared pole 44, through the center of conductive coils 46 to make a magnetic circuit between top pole 42 and shared pole 44. Shared pole 44 is relatively large and flat. Magnetic flux 58 leaves top pole 42 and enters shared pole 44. The direction of magnetic flux 58 depends upon the value of the data being written to the magnetic media.

During a write operation, most of magnetic flux 58 leaves top pole 42 and enters shared pole 44 through tape bearing surfaces 48 of top and shared poles 42 and 44. However, a minority of magnetic flux 58 leaves top pole 42 through a side surface of top pole 42 and enters shared pole 44 through a top surface of shared pole 44. Accordingly, when magnetic flux 58 leaves narrower top pole 42 and enters wider shared pole 44, most of magnetic flux 58 will take the path of least resistance between top and shared poles 42 and 44 (i.e., the shortest distance between the two poles), and will crowd into the portion of shared pole 44 immediately below top pole 42.

Some of magnetic flux 58, however, will spread out a little across shared pole 44, thereby negatively affecting the written data track width.

When prior art, inductive writer 70 is incorporated into first and second transducing heads 12 and 22 of FIG. 1, relatively large shared pole 44 is always the trailing pole which defines the track width of the written data. Accordingly, the track width of the written data is necessarily wider than if the data were written with top pole 42.

Figure 3B:
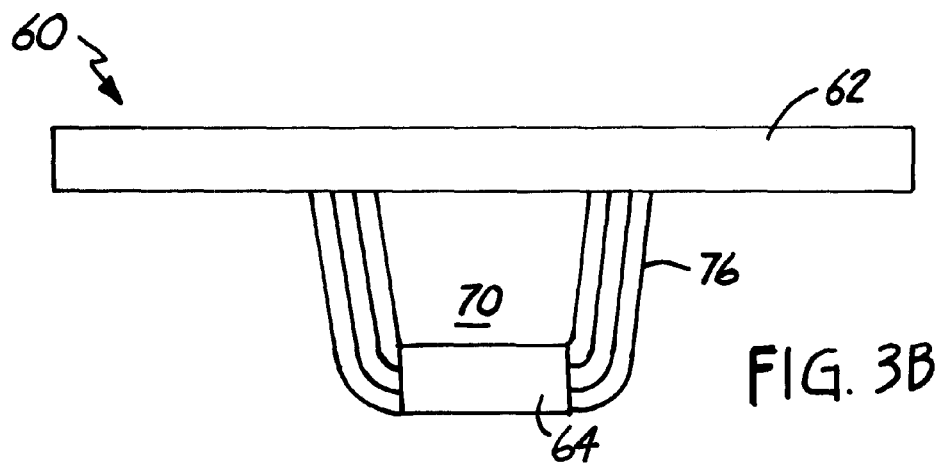
FIG. 3B is a view of an air bearing surface of the write head of FIG. 3A.
Figure 3A:
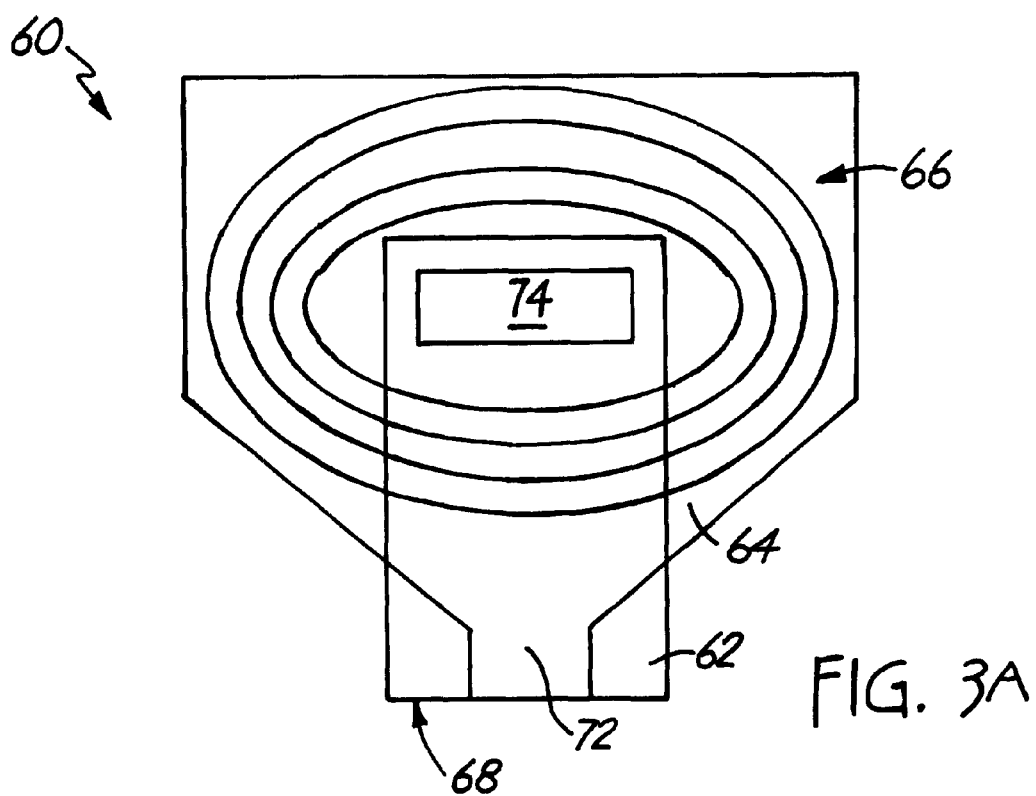
FIG. 3A is a top view of a thin film, inductive write head in accord with the present invention.

FIG. 3A is a top view of thin film, inductive write head 60 in accord with the present invention. Inductive write head 40 includes top pole 62, shared pole 64, conductive coils 66, and tape bearing surface 68. FIG. 3B is a view of tape bearing surface 68 of inductive write head 60 showing write gap 70. Top pole 62 is located above shared pole 64 and, at tape bearing surface 68, is wider in width than shared pole 64. Conductive coils 66 are positioned between top pole 62 and shared pole 64.

Compared with top pole 62, shared pole 64 is relatively large and flat; however, at tape bearing surface 68, shared pole 64 is narrower than top pole 62. In accord with the present invention, shared pole 64 is patterned to channel flux toward tape bearing surface 68 and includes neck 72 adjacent tape bearing surface 68. Top pole 62 includes back via 74, which extends from top pole 62 toward shared pole 64, through the center of conductive coils 66 to make a magnetic circuit between top pole 62 and shared pole 64. Magnetic flux 78 leaves top pole 62 and enters shared pole 64. The direction of magnetic flux 78 depends upon the value of the data being written to the magnetic media.

During a write operation, most of magnetic flux 78 leaves top pole 62 and enters shared pole 64 through tape bearing surfaces 68 of top and shared poles 62 and 64. However, a minority of magnetic flux 78 leaves top pole 62 through a bottom surface of top pole 62 and enters shared pole 64 through a side surface of shared pole 64. Accordingly, when magnetic flux 78 leaves wider top pole 62 and enters narrower shared pole 64, most of magnetic flux 78 will take the path of least resistance between top and shared poles 62 and 64 (i.e., the shortest distance between the two poles), and will crowd into the portion of shared pole 64 immediately below top pole 62. However, unlike prior art write head 40 of FIGS. 2A and 2B, the trailing pole is narrower shared pole 64 which prevents the divergence of magnetic flux 78. Accordingly, the written data track width is better controlled and better defined using write head 60 of the present invention than by using prior art write head 40.

Shared pole 64 may be composed of a topography-sensitive, high-moment material, such as FeXN, where X is a metal such as tantalum or aluminum.

When inductive writer 60 of the present invention is incorporated into first and second transducing heads 12 and 22 of FIG. 1, patterned shared pole 64 is always the trailing pole which defines the track width of the written data. Accordingly, the track width of the written data written with dual bump tape drive 10 incorporating inductive writer 60 of the present invention is necessarily better defined or better controlled than the track width of data written dual bump tape drive 10 incorporating prior art, inductive writer 40.

An additional advantage of inductive writer 60 of the present invention over prior art inductive writer 40 is that there will be less side-writing with inductive writer 60 than with inductive writer 40. A greater amount of side-writing necessitates a greater track width for the written data. With prior art inductive writer 40, wider shared pole 44 trails, allowing for magnetic flux 56 to diverge or spread out.

Conversely, with inductive writer 60 of the present invention, narrower shared pole 64 trails, preventing the divergence of magnetic flux 76. Accordingly, dual bump tape drive 10 incorporating inductive writer 60 of the present invention further allows for a narrower track width of the data written than dual bump tape drive incorporating prior art writer 40 by reducing the amount of side-writing.

A third advantage of inductive writer 60 of the present invention over prior art writer 40 is that allows for sharper head field gradients, which thereby allows for a greater linear bit density. Increased linear bit density requires sharp head field gradients and high coercivity media. At the transducing head level, this translates to the need for unsaturated pole tips and large write fields. In prior art writer 40, deep gap field is restricted by head saturation, which normally occurs at the junction between neck 52 and a remaining portion of top pole 42. For optimum performance, this junction should be as close to tape bearing surface 48 as possible. In practice, this means that the junction occurs on the hill formed by conductive coils 46. When the layers of prior art writer 40 are each sputtered films, top pole 42 will be thinner on its slope portion than on its non-sloping portion. In writer 60 of the present invention, neck 72 and top pole 62 are decoupled. In fact, neck 72 is formed as part of shared pole 64, which is substantially planar. Accordingly, it is easier to move the junction between neck 72 and a remaining portion of shared pole 64 closer to tape bearing surface 68, because the photolithographic pattern that defines neck 72 can be more easily produced on a planar surface.

As described above, shared pole 64 of writer 60 designed in accord the present invention is preferably formed of a topography-sensitive, high-moment material, such as FeXN. The use of such a material in shared pole 64, particularly at neck 72 of shared pole 64 further increases the allowable linear bit density by delaying the onset of head saturation. The use of a topography-sensitive, high-moment material for top pole 42 of prior art writer 40 does not have as great an impact as when used for shared pole 64 of writer 60 because the crystallography of these materials results in a decreased permeability when it is deposited on a slope (as is necessary with prior art writer 40) rather than in a planar surface.

In conclusion, the present invention is a dual bump tape head having two inductive writers, each of which have a patterned shared pole. The use of a patterned shared pole allows for increased data storage areal density (both track and linear) by writing with the narrower of the two poles, minimizing side-writing, and sharpening the head field gradients.

Those skilled in the art of electronic data storage will recognize that the inductive writer of the present invention may be used as a single writer in both disc drive and tape drive applications. Additionally, the inductive writer of the present invention may be used in dual bump tape heads having configurations of the first and second writers that varies from that shown in FIG. 1. For instance, the top poles could be centrally located, while the shared poles are peripherally located.

Although the present invention has been described with reference to preferred embodiments, workers skilled in the art will recognize that changes may be made in form and detail without departing from the spirit and scope of the invention.

What is claimed is:

1. For use in an electronic data storage system of the type including:
   a magnetic medium;
   a magnetoresistive read head comprising a bottom shield, a shared pole and a magnetoresistive read element positioned between the bottom shield and the shared pole; and
   thin-film, inductive write head comprising a top pole, the shared pole and a conductive coil positioned between the top pole and the shared pole, the top pole being separated from the shared pole at an air bearing surface of the write head by a write gap and being in contact with the shared pole distant the air bearing surface, the shared pole having a width at the air bearing surface narrower than a width of the top pole at the air bearing surface;
   a method of writing data comprising:
      moving the magnetic medium relative to the transducing head such that the shared pole trails the top pole in respect to a direction of motion of the magnetic medium during a write operation by the write head; and
      generating a magnetic field to cause the writing of data to the magnetic medium with a width of the written data defined by the shared pole.

2. In an electronic data storage system of the type comprising:
   a moving magnetic medium; and
   a transducing head comprising a bottom shield, a shared pole that is substantially planar throughout, a magnetoresistive read element positioned between the bottom shield and the shared pole, a top pole and a conductive coil positioned between the shared pole and the top pole;
in which, during a write operation, the shared pole trails the top pole in respect to a direction of motion of the medium so that the written track width is defined by the shared pole, an improvement comprising:
   the shared pole being patterned to have a width at a media bearing surface narrower than the top pole.

3. The electronic data storage system of claim 2 wherein the shared pole is composed of a topography-sensitive, high-moment material.

4. The electronic data storage system of claim 3 wherein the topography-sensitive high-moment material is FeXN, wherein X is a metal.

5. The electronic data storage system of claim 3 wherein the topography-sensitive high-moment material is FeXN, wherein X is a tantalum.

6. The electronic data storage system of claim 3 wherein the topography-sensitive high-moment material is FeXN, wherein X is aluminum.

7. A read while write tape head configured for longitudinal recording on a moving magnetic tape medium, the head comprising a first transducing head and a second transducing head in which a leading of the first and second transducing heads writes data to the tape medium while a trailing of the first and second transducing heads reads data from the tape medium;
   the first transducing head comprising:
      a first top pole having a first width at a tape bearing surface of the head, the first top pole being operable to generate magnetic flux during a write operation; and
      a first shared pole having a second width at the tape bearing surface of the head, the second width being smaller than the first width, the first shared pole being operable to receive magnetic flux generated by the first top pole and thereby define a written data track width; and the second transducing head comprising:
- a second top pole having a third width at the tape bearing surface of the head, the second top pole being operable to generate magnetic flux during a write operation; and
- a second shared pole adjacent to the first shared pole, the second shared pole having a fourth width at the tape bearing surface of the head, the fourth width being smaller than the third width, the second shared pole being operable to receive magnetic flux generated by the second top pole and thereby define a written data track width.

8. The read while write tape head of claim 7 wherein the first shared pole and the second shared pole are each composed of a topography-sensitive, high-moment material.

9. The read while write tape head of claim 8 wherein the topography-sensitive high-moment material is FeXN, wherein X is a metal.

10. The read while write tape head of claim 8 wherein the topography-sensitive high-moment material is FeXN, wherein X is a tantalum.

11. The read while write tape head of claim 8 wherein the topography-sensitive high-moment material is FeXN, wherein X is aluminum.

12. The read while write tape head of claim 7 wherein each of the first shared pole and the second shared pole is substantially planar throughout.

* * * * *